(12) United States Patent
Juffa

(10) Patent No.: US 7,916,864 B2
(45) Date of Patent: Mar. 29, 2011

(54) GRAPHICS PROCESSING UNIT USED FOR CRYPTOGRAPHIC PROCESSING

(75) Inventor: Norbert Juffa, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 984 days.

(21) Appl. No.: 11/350,137

(22) Filed: Feb. 8, 2006

(65) Prior Publication Data
US 2007/0198412 A1    Aug. 23, 2007

(51) Int. Cl.
H04N 7/167    (2006.01)
G06F 17/00    (2006.01)
G06F 15/76    (2006.01)

(52) U.S. Cl. ............ 380/200; 380/28; 380/37; 380/259; 345/418; 345/605; 345/643; 713/150; 713/168; 713/193; 712/20; 712/21; 712/22

(58) Field of Classification Search .......... 713/189–193, 713/160–167, 150–154; 380/255–283, 29–30, 380/200; 708/490; 726/21, 3–15, 27–30
See application file for complete search history.

(56) References Cited

U.S. PATENT DOCUMENTS

| | | | | |
|---|---|---|---|---|
| 5,953,241 | A * | 9/1999 | Hansen et al. | 708/501 |
| 6,529,928 | B1 * | 3/2003 | Resnick et al. | 708/505 |
| 7,159,112 | B1 * | 1/2007 | Williams | 713/168 |
| 2003/0140241 | A1 * | 7/2003 | England et al. | 713/194 |
| 2004/0105541 | A1 | 6/2004 | Elbe et al. | |
| 2008/0068389 | A1 * | 3/2008 | Bakalash et al. | 345/505 |
| 2009/0031117 | A1 * | 1/2009 | Farooqui et al. | 712/220 |

FOREIGN PATENT DOCUMENTS

| | | |
|---|---|---|
| JP | 2000-207387 | 7/2000 |
| JP | 2000-353077 | 12/2000 |
| JP | 2001-266103 | 9/2001 |
| JP | 2002-149396 | 5/2002 |
| JP | 2003-216411 | 7/2003 |
| WO | WO 01/05089 | 1/2001 |

OTHER PUBLICATIONS

"Graphics Processing Unit Architecture (GPU Arch)", Ajit et al., Apr. 14, 2005.*
Wikipedia (http://en.wikipedia.org/wiki/Transport_Layer_Security).*
Cook et al., "Secret Key Cryptography Using Graphics Cards" Technical Report, Jan. 14, 2004, pp. 1-14.
Moss, et al. "Toward Acceleration of RSA Using 3D Graphics Hardware", LNCS 4887. Dec. 2007. pp. 369-388.
Eggers, et al. "Simultaneous Multithreading: A Platform for Next-Generation Processors," *IEEE Micro*, vol. 17, No. 5, pp. 12-19, Sep./Oct. 1997.

(Continued)

*Primary Examiner* — Taghi T Arani
*Assistant Examiner* — Mohammad L Rahman
(74) *Attorney, Agent, or Firm* — Patterson & Sheridan. LLP.

(57) ABSTRACT

A graphics processing unit is programmed to carry out cryptographic processing so that fast, effective cryptographic processing solutions can be provided without incurring additional hardware costs. The graphics processing unit can efficiently carry out cryptographic processing because it has an architecture that is configured to handle a large number of parallel processes. The cryptographic processing carried out on the graphics processing unit can be further improved by configuring the graphics processing unit to be capable of both floating point and integer operations.

18 Claims, 6 Drawing Sheets

OTHER PUBLICATIONS

Cook et al., "Cryptographics: Secret Key Cryptography Using Graphics Cards," Topics in Cryptology-CT-RSA 2005, The Cryptographers' Track at the RSA Conference 2005, Proceedings (Lecture Notes in Computer Science vol. 3376), Springer Verlag Berlin, Germany, 2005, pp. 334-350, XP-002478385.
European Search Report dated Apr. 29, 2008.
English translation of JP 2000-353077, provided as explanation of relevance.
English translation of JP 2001-266103, provided as explanation of relevance.
English translation of JP 2003-216411, provided as explanation of relevance.
English translation of JP 2002-149396, provided as explanation of relevance.
English translation of JP 2000-207387, provided as explanation of relevance.
Wikipedia definition of "GPGPU," Jan. 30, 2006.

* cited by examiner

GRAPHICS PROCESSING UNIT USED FOR CRYPTOGRAPHIC PROCESSING

BACKGROUND OF THE INVENTION

1. Field of the Invention

The field of the invention relates generally to computer systems and more specifically to the use of a graphics processing unit for cryptographic processing.

2. Description of the Related Art

The continued proliferation of the Internet and the continued expansion of electronic commerce have increased the need for solutions that provide secure transactions and data exchanges in a fast, inexpensive manner.

An online shopping service that manages millions of online purchase transactions on a daily basis requires such a solution. In a typical online purchase transaction, secure sockets layer (SSL) is used as the protocol for exchanging transaction information between the purchaser and the online shopping service. The SSL protocol provides very good security but its key exchange and authentication component requires computationally expensive operations. An example of such operations known in the art is the RSA public key system using key lengths of up to 2048 bits. As a result, administering the SSL protocol has become a substantial computational burden on servers that perform secure transactions.

Also, financial institutions that exchange a large amount (e.g., terabytes) of data over unsecured networks like the Internet require secure data transport methods that are also fast and inexpensive, because the standard methods for bulk encryption and decryption, such as DES, 3DES, and AES, are computationally very expensive.

One conventional encryption/decryption implementation uses a general purpose microprocessor to perform all aspects of the encryption/decryption operation, including the large number of multiply operations required to perform RSA based key exchange and authentication. Although this implementation has the advantage that it can be performed using a conventional microprocessor without any additional specialized hardware, this solution has the disadvantage that it may suffer from poor performance due to the low multiplication throughput of the microprocessor.

Another conventional implementation uses a dedicated encryption/decryption hardware card to provide specialized logic for performing the described multiplication algorithm. This hardware card typically includes additional multiplication logic for performing each component of the multiplication algorithm more quickly than a general purpose microprocessor. However, this solution has the disadvantage that such hardware cards are very expensive.

SUMMARY OF THE INVENTION

According to embodiments of the present invention, a graphics processing unit is used for cryptographic processing. A graphics processing unit can support cryptographic processing effectively because it has an architecture that is configured to handle a large number of parallel processes, much more so than conventional microprocessors. Moreover, most computing devices come equipped with graphics processing units and, as a result, effective cryptographic processing solutions can be provided without incurring additional hardware costs.

According to another aspect of the present invention, a graphics processing unit that is capable of both floating point and integer operations is used for cryptographic processing.

In general, a graphics processing unit that is capable of integer operations performs wide multiplication operations, which are common in cryptographic processing, more efficiently than one that is capable of only floating point operations. Furthermore, a graphics processing unit that is capable of integer operations performs certain operations that are carried out during bulk encryption and decryption, such as bit manipulation (e.g., shifts, rotates) that cannot be done by a graphics processing unit that is capable of only floating point operations. As a result, cryptographic processing efficiency can be further improved by the use of a graphics processing unit that is capable of both floating point and integer operations.

The present invention also provides methods for authenticating online transactions and securely exchanging large amounts of data over a computer network using a graphics processing unit.

The method for authenticating online transactions, according to an embodiment of the present invention, includes the steps of receiving a secure transaction request from a client computer and transmitting a certificate and a public key in response thereto, receiving an encrypted key from the client computer and decrypting the encrypted key using a graphics processing unit, and transmitting a message to the client computer that the encrypted key has been successfully decrypted. The method for authenticating online transactions may further comprise the steps of receiving encrypted transaction data from the client computer, decrypting the encrypted transaction data using the graphics processing unit, and generating and encrypting a transaction response message and transmitting the encrypted transaction response message to the client computer.

The method for securely exchanging large amounts of data over a computer network, according to an embodiment of the present invention, includes the steps of partitioning the data into a plurality of data blocks, encrypting each of the data blocks using the graphics processing unit, merging the encrypted data blocks into an encrypted dataset, and transmitting the encrypted dataset over the computer network. The method for securely exchanging large amounts of data over a computer network may further comprise the steps of receiving the encrypted dataset over the computer network, partitioning the encrypted dataset into a plurality of data blocks, decrypting each of the encrypted data blocks using the graphics processing unit, combining the decrypted blocks into a decrypted dataset, and transmitting an acknowledgement of receipt and successful decryption over the computer network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
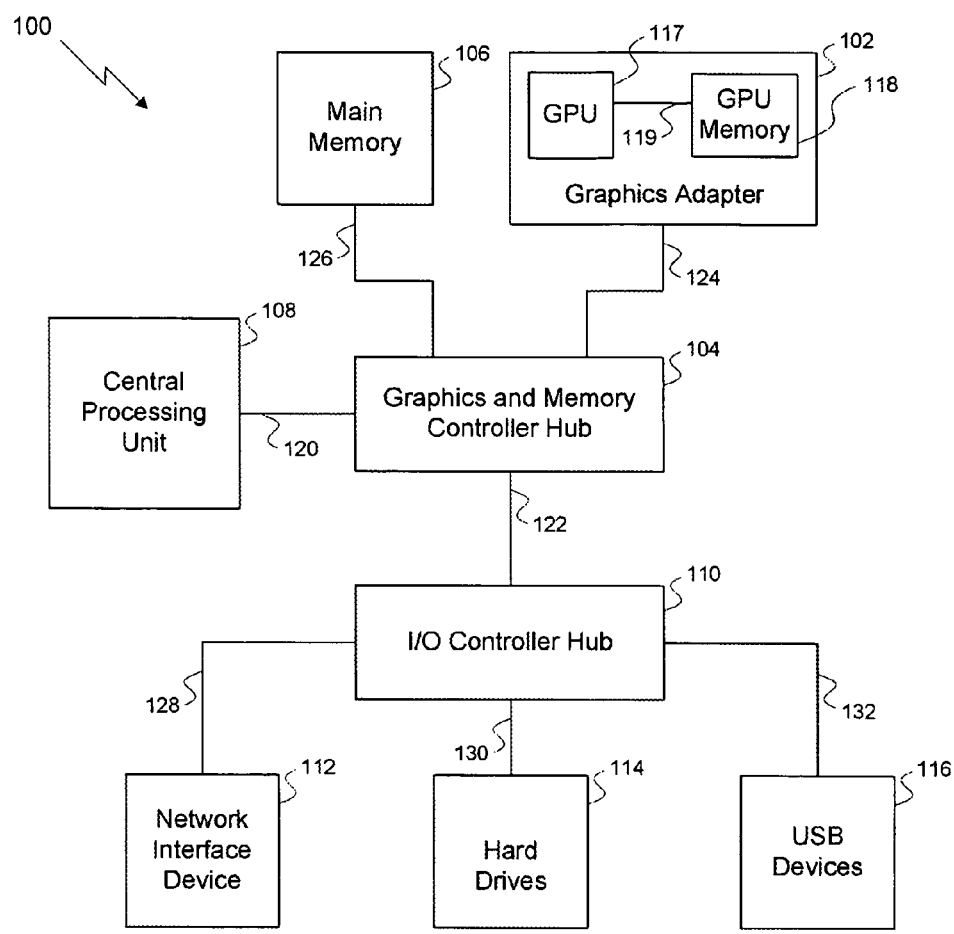
FIG. 1 illustrates a computing device according to an embodiment of the invention.

FIG. 1 illustrates a computing device 100 according to an embodiment of the present invention. The computing device 100 includes a graphics adapter 102, a graphics and memory controller hub 104 (sometimes referred to as a "northbridge"), a main memory 106, a central processing unit (CPU) 108, an I/O controller hub 110 (sometimes referred to as a "southbridge"), a network interface device 112, a series of hard drives 114, and a series of USB devices 116. The graphics adapter 102 includes a graphics processing unit (GPU) 117 and a GPU memory 118. The GPU 117 is coupled to the GPU memory 118 through a link 119. The graphics and memory controller hub 104 is coupled to the CPU 108, the main memory 106, the graphics adapter 102 and the I/O controller hub 110 through links 120, 126, 124 and 122, respectively. The I/O controller hub 110 is coupled to the network interface device 112, the series of hard drives 114 and the series of USB devices 116 through links 128, 130 and 132, respectively.

According to the embodiment of the present invention illustrated herein, the links 120, 122, 124, 126, 128, and 130 are high-speed serial bus links, e.g., PCI Express (PCIe) links. Other types of links may be provided in alternative embodiments of the present invention.

The GPU 117 is configured to process graphics data and has a highly parallel architecture. In one embodiment, there are 16 single instruction, multiple data (SIMD) processing units in the GPU 117, and each SIMD unit is capable of processing 32 threads in parallel. Furthermore, the GPU 117 is capable of carrying out both floating-point operations and integer operations, and performs various types of cryptographic operations more efficiently than conventional GPUs that are capable of only floating-point operations.

With its ability to perform integer operations, the GPU 117 improves the efficiency of long integer multiplication, which is a common cryptographic operation. Long integer multiplication requires: (i) a single-width to double-width multiplication primitive; and (ii) efficient ways of propagating carries, and the GPU 117 is able to perform both of these operations more efficiently than the conventional GPUs. First, it performs the single-width to double-width multiplication primitive without the overhead associated with integer-to-floating point conversions that are required by the conventional GPUs. Second, it handles carry propagation easily by using add-with-carryout and add-with-carryin integer instructions that are not available in conventional GPUs.

The GPU 117 can also perform certain operations used in bulk encryption and decryption that cannot be performed by the conventional GPUs. These operations require a processing unit that is capable of integer operations, and include bit manipulation steps, such as shifts, rotates, etc.

Figure 2:
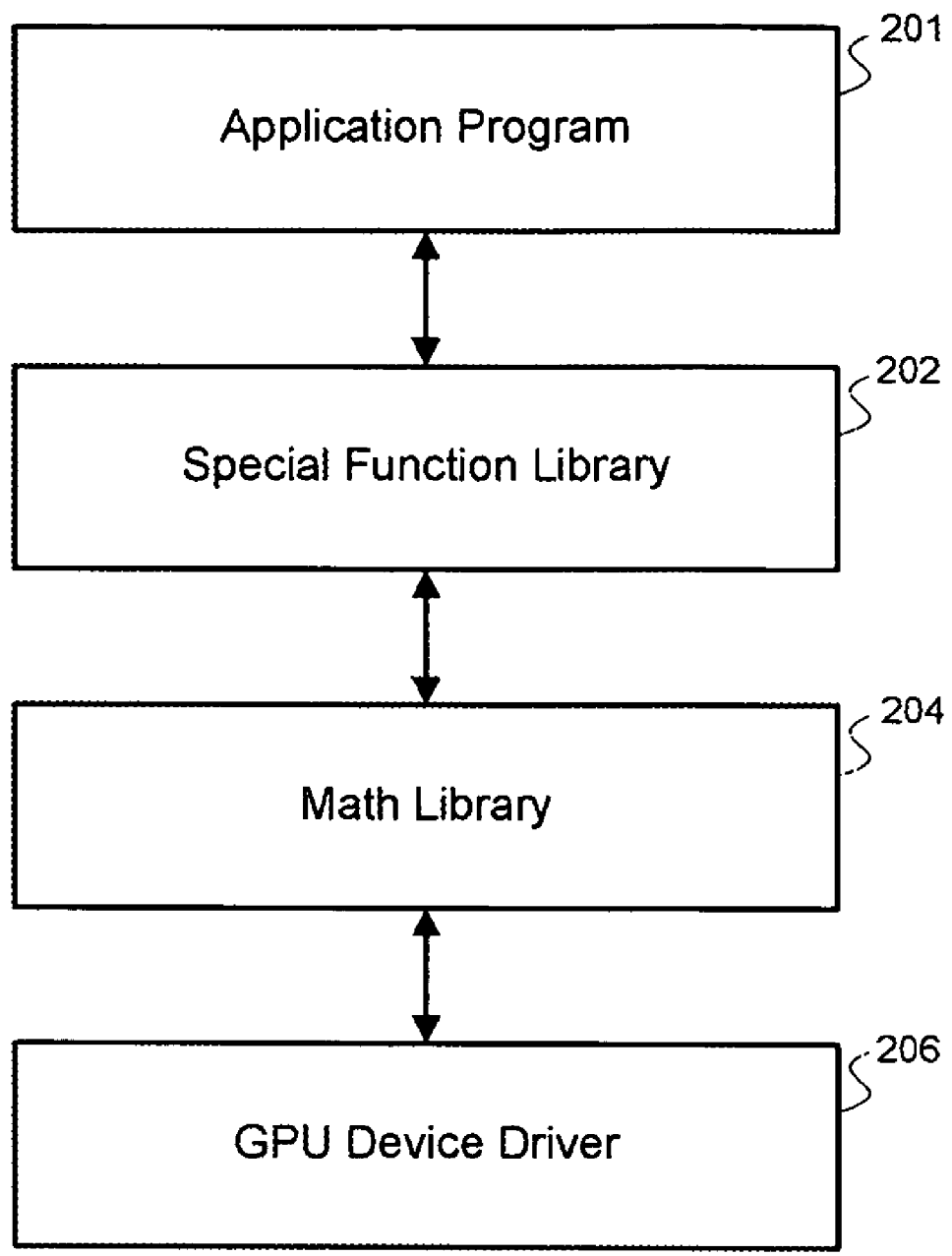
FIG. 2 is a conceptual diagram that illustrates various software layers that enable the graphics processing unit to be used for cryptographic processing.

According to various embodiments of the present invention, the GPU 117 is programmed to carry out cryptographic processing. FIG. 2 is a conceptual diagram that illustrates various software layers that enable the GPU 117 for cryptographic processing. The software layers include an application program 201, a special function library 202, a math library 204, and a GPU device driver 206. The application program 201 initiates a cryptographic application that requires cryptographic processing. The special function library 202 includes cryptographic functions that are called by the application program 201. The math library 204 includes math functions that are called by the cryptographic functions. The GPU device driver 206 includes software that enables the math functions in the math library 204 to be executed by the GPU 117.

For example, a cryptographic application may include encryption or decryption operations that require the multiplication of wide numbers, which is referred to herein as "wide multiplication." In such a case, an encryption or decryption special function is called from the special function library 202, and the encryption or decryption special function in turn calls a wide multiplication function from the math library 204. The wide multiplication function is then executed by the GPU 117 through the GPU device driver 206. The GPU device driver 206 controls the GPU 117 to carry out the wide multiplication function in the following manner. The GPU 117 splits the multiplicand and multiplier into multiple smaller multiplicands and multipliers, organizes the smaller multiply operations (partial product generation operations) into a series of threaded multiply/accumulate operations, performs the smaller multiply/accumulate operations, executes a final summation/shifting of each thread's results, and then returns the arithmetically correct wide multiplication result.

A number that is represented by N bits is considered to be a wide number in relation to a computing device that performs arithmetic operations on that number, if the computing device hardware is configured to support M-bit arithmetic logic, where $M<N$. For example, a 128-bit number is considered to be a wide number in a computing device that has 32-bit wide arithmetic logic units.

Figure 3:
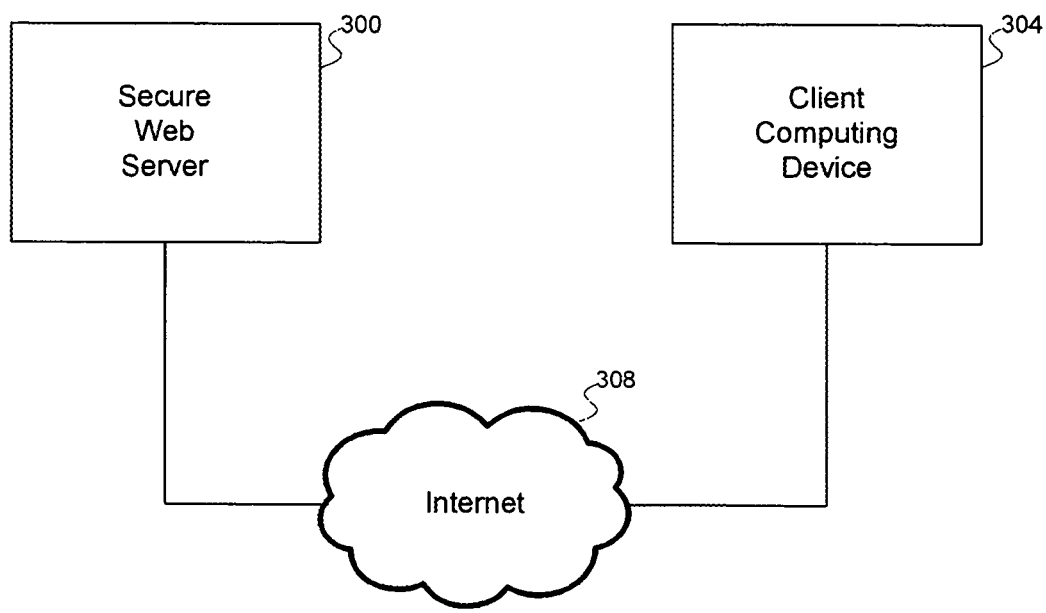
FIG. 3 illustrates a typical secure web transaction environment.

One example use of the GPU 117 for cryptographic processing is illustrated in FIG. 3. FIG. 3 is an illustration of a secure web transaction environment in which a secure web server 300 is configured like the computing device 100 of FIG. 1. In this environment, an online shopper communicates with the secure web server 300 over the Internet 308 to make online purchases using his or her computing device 304.

Figure 4:
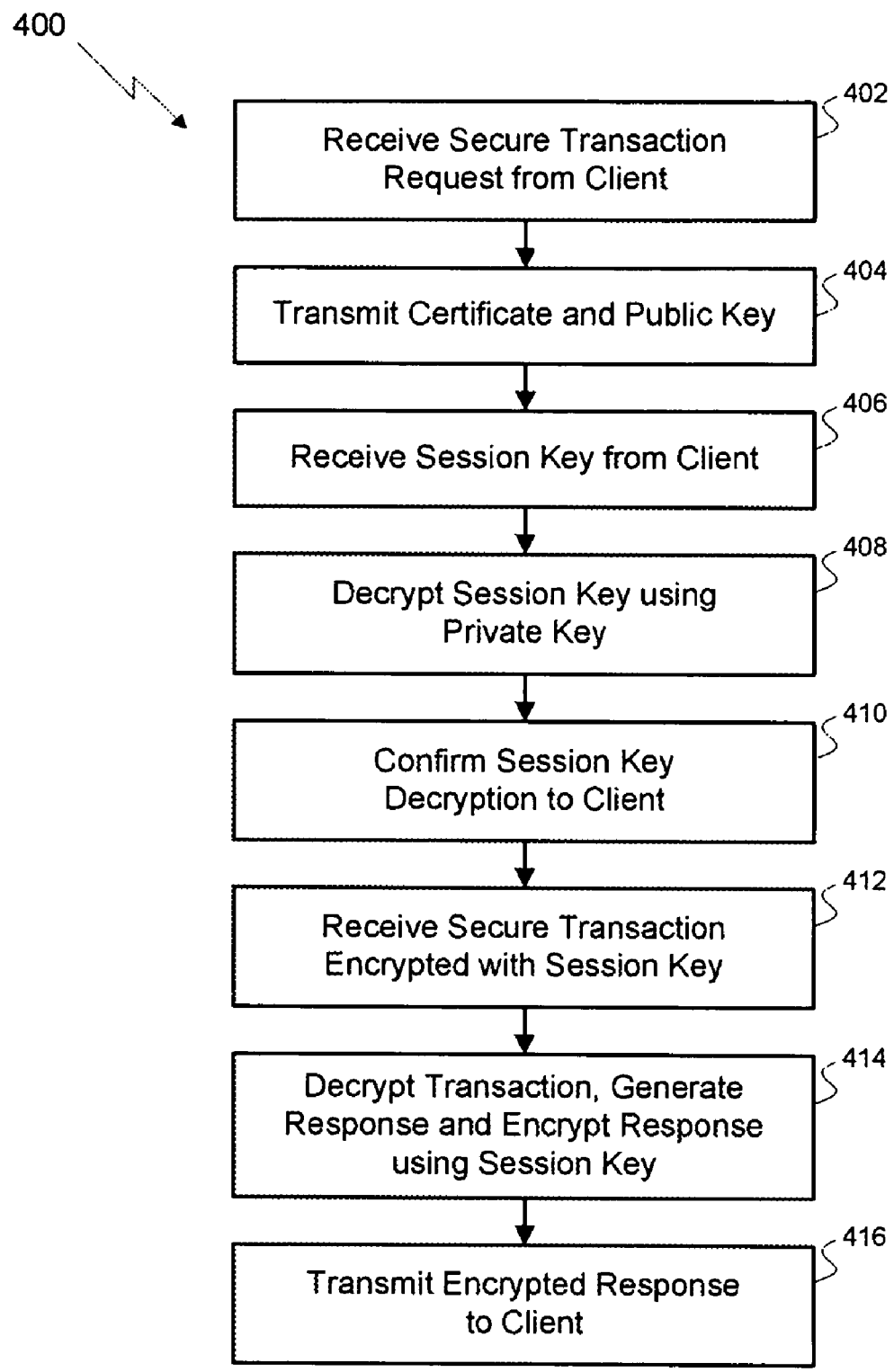
FIG. 4 illustrates a flowchart of method steps for processing a secure web transaction.

FIG. 4 illustrates a flowchart of method steps 400 for processing a secure web transaction in the environment illustrated in FIG. 3 in accordance with a protocol known as Secure Sockets Layer (SSL). The method begins with the secure web server 300 receiving a secure transaction request from a client computing device 304 (step 402). In step 404, the secure web server 300 responds to the secure transaction request by transmitting its certificate and public key. Once the secure web server 300 transmits its certificate and public key, it waits to receive a session key from the client computing device 304. The session key is made up of a shared key that is encrypted using the public key provided by the secure web server 300. Once this session key is received in step 406, the secure web server 300 decrypts the session key using its private key that is associated with the public key that was transmitted to the client computing device 304 (step 408). Next, the secure web server 300 transmits a message to the client computing device 304 that the session key has been decrypted successfully and waits for a secure transaction to be received from the client computing device 304 (step 410). Once the secure web server 300 receives a secure transaction from the client computing device 304 in step 412, the secure web server 300 decrypts the secure transaction in step 414 using the session key. The secure web server 300 then generates a transaction response message (e.g. a sales confirmation message) and encrypts that transaction response using the session key. The method concludes with the secure server transmitting the encrypted transaction response to the client computing device 304 in step 416.

Figure 5:
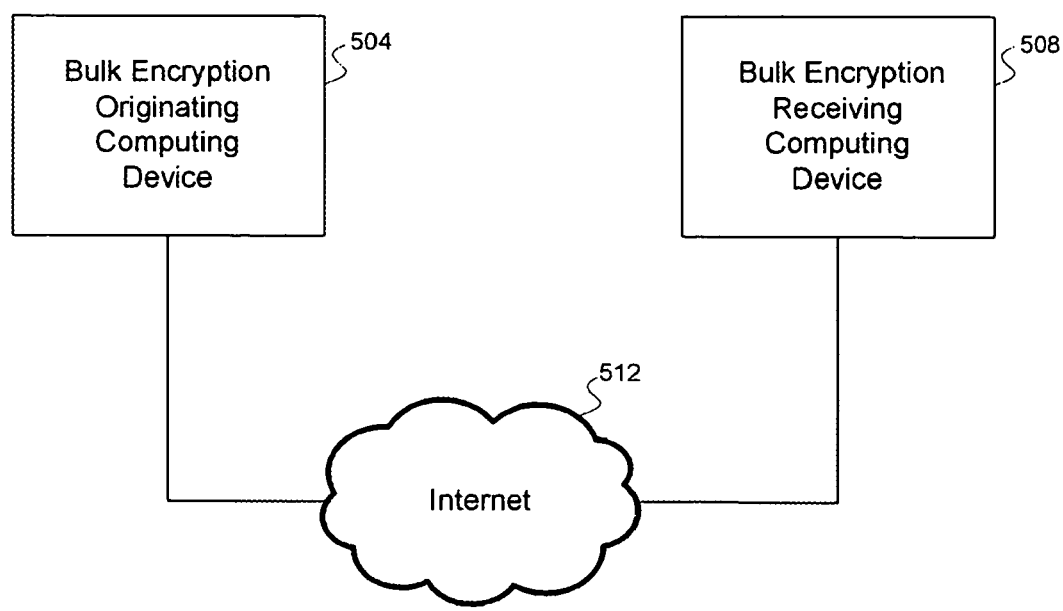
FIG. 5 illustrates a typical bulk encryption/decryption environment.

Another example use of the GPU 117 for cryptographic processing is illustrated in FIG. 5. FIG. 5 is an illustration of a bulk encryption/decryption environment in which computing devices 504, 508 are configured like the computing device 100 of FIG. 1. In this environment, the first computing device 504 exchanges a large block of data with the second computing device 508 over the Internet 512. For security purposes, the large block of data is encrypted by the first computing device 504 prior to transmission and decrypted by the second computing device 508 after reception.

Figure 6:
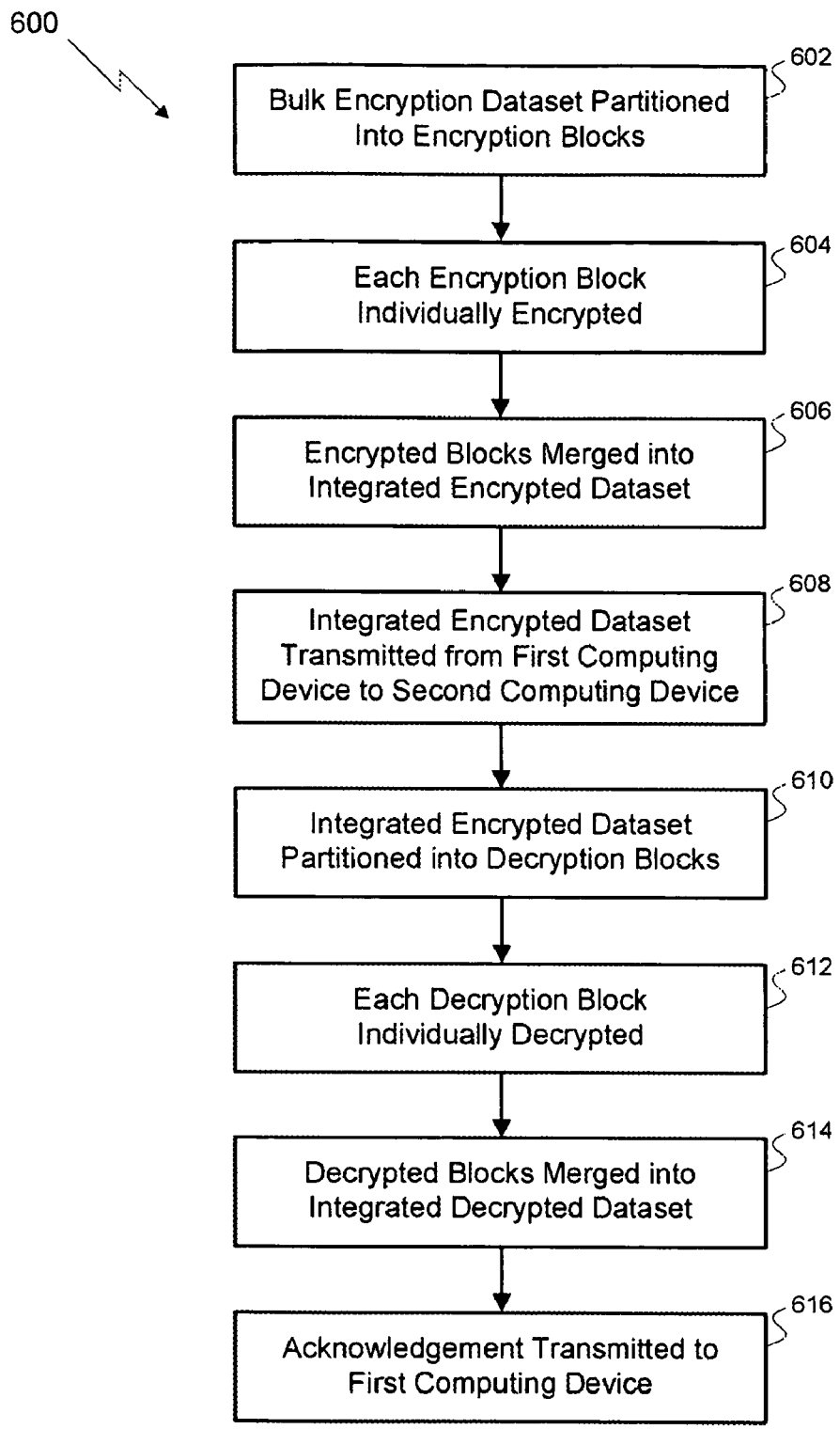
FIG. 6 illustrates a flowchart of method steps for performing a bulk encryption/decryption.

FIG. 6 illustrates a flowchart of method steps 600 for performing a bulk encryption by the first computing device 504 and a bulk decryption by the second computing device 508. The method begins, with the first computing device 504 partitioning a bulk encryption dataset into a series of encryption blocks to be individually encrypted in step 602. In step 604, the first computing device 504 encrypts each encryption block and then merges the series of encrypted encryption blocks into an integrated, encrypted dataset in step 606. In step 608, the first computing device 504 transmits the encrypted dataset to the second computing device 508, which subsequently partitions the encrypted dataset into decryption blocks in step 610. In step 612, the second computing device 508 decrypts each decryption block, and in step 614, the second computing device 508 merges the decrypted blocks into an integrated decrypted dataset. The method concludes with the second computing device 508 sending a message to the first computing device 504, acknowledging that the encrypted data has been received and successfully decrypted in step 616.

While the foregoing is directed to embodiments of the present invention, other and further embodiments of the invention may be devised without departing from the basic scope thereof. The scope of the present invention is determined by the claims that follow.

What is claimed is:

1. A computing device comprising:
   a processing unit for executing a cryptographic application program stored in memory; and
   a graphics processing unit that is controlled by a device driver stored in memory, wherein the device driver enables a wide multiplication function to be executed by the graphics processing unit, wherein the graphics processing unit comprises 16 single instruction, multiple data (SIMD) processing units and each SIMD unit is capable of processing 32 threads in parallel, and executing the wide multiplication function includes:
   splitting a multiplicand into smaller multiplicands;
   splitting a multiplier into smaller multipliers;
   generating partial product generation operations, wherein each partial product generation operation involves one smaller multiplicand and one corresponding smaller multiplier;
   organizing the partial product generation operations into threaded operations;
   executing the threaded operations by the SIMD processing units to generate threaded results; and
   executing a summation operation or a shifting operation to combine the threaded results to produce an arithmetically correct wide multiplication result,
   wherein the cryptographic application program includes instructions for invoking an encryption or decryption special function that is called from a special function library, the encryption or decryption special function in turn calling the wide multiplication function that is executed in the graphics processing unit through the device driver.

2. The computing device according to claim 1, wherein the cryptographic application program is a server program that enables a server computer to securely communicate with client computers over a computer network.

3. The computing device according to claim 2, wherein the server computer communicates with the client computers in accordance with the Secure Sockets Layer (SSL) protocol.

4. The computing device according to claim 1, wherein the cryptographic application program is a bulk encryption program for encrypting a large amount of data and transmitting the encrypted data over a computer network.

5. The computing device according to claim 1, wherein the cryptographic application program is a bulk decryption program for receiving a large amount of encrypted data over a computer network and decrypting the large amount of encrypted data.

6. The computing device according to claim 1, wherein the graphics processing unit is configured for floating-point operations and add-with-carryout and add-with-carryin integer operations.

7. A computer-implemented method for processing a security transaction, comprising the steps of:
   receiving a security transaction request;
   routing said security transaction request to a graphics processing unit that is controlled by a device driver stored in memory, wherein the device driver enables a wide multiplication function to be executed by the graphics processing unit and the graphics processing unit comprises 16 single instruction, multiple data (SIMD) processing units and each SIMD unit is capable of processing 32 threads in parallel; and
   processing said security transaction request on said graphics processing unit by calling an encryption or decryption special function from a special function library, the encryption or decryption special function in turn calling a wide multiplication function is executed on said graphics processing unit through the device driver, wherein executing the wide multiplication function includes:
   splitting a multiplicand into smaller multiplicands;
   splitting a multiplier into smaller multipliers;
   generating partial product generation operations, wherein each partial product generation operation involves one smaller multiplicand and one corresponding smaller multiplier;
   organizing the partial product generation operations into threaded operations;
   executing the threaded operations by the SIMD processing units to generate threaded results; and
   executing a summation operation or a shifting operation to combine the threaded results to produce an arithmetically correct wide multiplication result.

8. The method according to claim 7, wherein said security transaction is an authentication transaction.

9. The method according to claim 8, wherein the step of processing said security transaction request includes the steps of:
   receiving an encrypted key;
   decrypting the encrypted key using the graphics processing unit; and
   transmitting a message that the encrypted key has been successfully decrypted.

10. The method according to claim 8, wherein the step of processing said security transaction request includes the steps of:
- receiving encrypted transaction data;
- decrypting the encrypted transaction data using the graphics processing unit; and
- generating and encrypting a transaction response message and transmitting the encrypted transaction response message.

11. The method according to claim 10, wherein the step of decrypting includes the step of executing a wide multiplication operation using the graphics processing unit.

12. The method according to claim 7, wherein the graphics processing unit is configured for floating-point operations and add-with-carryout and add-with-carryin integer operations.

13. The method according to claim 7, wherein said security transaction is an encryption transaction.

14. The method according to claim 13, wherein the step of processing said security transaction request includes the steps of:
- partitioning the data into a plurality of data blocks;
- encrypting each of the data blocks using the graphics processing unit;
- merging the encrypted data blocks into an encrypted dataset; and
- transmitting the encrypted dataset.

15. The method according to claim 14, wherein the step of encrypting includes the step of performing a bit manipulation using the graphics processing unit.

16. The method according to claim 7, wherein said security transaction is a decryption transaction.

17. The method according to claim 16, wherein the step of processing said security transaction request includes the steps of:
- receiving an encrypted dataset;
- partitioning the encrypted dataset into a plurality of data blocks;
- decrypting each of the encrypted data blocks using the graphics processing unit;
- combining the decrypted blocks into a decrypted dataset; and
- transmitting an acknowledgement of receipt and successful decryption.

18. The method according to claim 17, wherein the step of decrypting includes the step of performing a bit manipulation using the graphics processing unit.

* * * * *